United States Patent
Asada

(10) Patent No.: US 7,388,469 B2
(45) Date of Patent: Jun. 17, 2008

(54) ELECTRONIC KEY APPARATUS FOR VEHICLE AND ARREST CANCELLATION METHOD FOR ROTATION ARRESTING DEVICE

(75) Inventor: Tetsuya Asada, Hadano (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 245 days.

(21) Appl. No.: 10/359,631

(22) Filed: Feb. 7, 2003

(65) Prior Publication Data

US 2003/0151873 A1 Aug. 14, 2003

(30) Foreign Application Priority Data

Feb. 14, 2002 (JP) ............................. 2002-036527

(51) Int. Cl.
H04Q 5/22 (2006.01)
G05B 19/00 (2006.01)
G06F 7/00 (2006.01)
G08B 13/00 (2006.01)
H04B 1/00 (2006.01)

(52) U.S. Cl. ...................... 340/10.5; 340/10.3; 340/5.3

(58) Field of Classification Search ........... 340/825.69, 340/825.72, 10.1, 10.3, 10.4, 10.5, 5.6, 5.7, 340/426.3, 5.3, 5.31, 5.2, 5.8; 307/10.5, 307/10.3
See application file for complete search history.

(56) References Cited

U.S. PATENT DOCUMENTS

| | | | | |
|---|---|---|---|---|
| 5,136,284 A | * | 8/1992 | Kitamura | 340/5.22 |
| 5,229,648 A | * | 7/1993 | Sues et al. | 307/10.2 |
| 5,293,160 A | * | 3/1994 | Kurozu et al. | 340/5.3 |
| 5,708,307 A | * | 1/1998 | Iijima et al. | 307/10.5 |
| 5,949,152 A | * | 9/1999 | Tagawa et al. | 307/10.5 |
| 5,973,411 A | * | 10/1999 | Tado et al. | 307/10.5 |
| 6,188,140 B1 | * | 2/2001 | Kito et al. | 307/10.4 |
| 6,191,703 B1 | * | 2/2001 | Wallace | 340/825.69 |
| 6,259,168 B1 | * | 7/2001 | Okada | 307/10.5 |
| 6,332,572 B1 | * | 12/2001 | Yamamoto et al. | 235/382 |
| 6,400,254 B2 | * | 6/2002 | Yamamoto et al. | 340/5.6 |
| 6,798,337 B2 | * | 9/2004 | Onuma et al. | 340/5.72 |
| 6,816,059 B2 | * | 11/2004 | Yanaka | 340/5.72 |

FOREIGN PATENT DOCUMENTS

| | | |
|---|---|---|
| EP | 0 801 192 A1 | 10/1997 |
| EP | 0 905 337 A1 | 3/1999 |
| EP | 1 088 716 A2 | 4/2001 |
| EP | 1 118 515 A2 | 7/2001 |
| EP | 1 128 007 A2 | 8/2001 |
| JP | 2001-349117 A | 12/2002 |

\* cited by examiner

*Primary Examiner*—Brian Zimmerman
*Assistant Examiner*—Nam Nguyen
(74) *Attorney, Agent, or Firm*—Foley & Lardner LLP

(57) ABSTRACT

Based upon the results of an ID check with an ignition knob lock device which prevents rotational operation of an ignition knob which is used when stating an engine of a vehicle, and of an ID check with a portable unit, a passive control unit transmits to the ignition knob lock device a command to release prohibition of rotational operation of the ignition knob, and performs an ID check with the ignition knob lock device before detecting an operation of pushing in the ignition knob.

12 Claims, 5 Drawing Sheets

ELECTRONIC KEY APPARATUS FOR VEHICLE AND ARREST CANCELLATION METHOD FOR ROTATION ARRESTING DEVICE

BACKGROUND OF THE INVENTION

1. Field of the Invention

The present invention relates to an electronic key apparatus for a vehicle which performs wireless transmission between an electronic key which is carried by the vehicle driver and a device mounted upon the vehicle, and which releases the locked state of a door or starts the vehicle engine upon checking of the ID of the driver; and further relates to a method for arrest cancellation of a rotation arresting device.

2. Description of the Related Art

An electronic key system for a vehicle which checks the ID of the vehicle driver by performing wireless transmission between an electronic key which is carried by the driver and a device mounted upon the vehicle, and which releases the locked state of a door or starts the vehicle engine based upon the result of this checking, is per se known (see Japanese Laid-Open Patent Publication No. 2001-349117). With such an electronic key system for a vehicle, in order to enhance the anti theft characteristics, ID checking is performed between the vehicle mounted device and the electronic key when, in order to start the engine the driver performs the operation of pushing in the ignition knob; and, when it has been determined that the electronic key is the proper one, then it is arranged to allow rotation of the ignition knob, only after further ID checking has been performed between the vehicle mounted device and an ignition knob lock unit which prohibits rotation of the ignition knob.

SUMMARY OF THE INVENTION

However, with such a prior art type electronic key system, since the ID checking between the vehicle mounted device and the ignition knob lock unit is performed only after the ID checking between the vehicle mounted device and the electronic key has been performed, and since the mechanism which permits rotation of the ignition knob is required to operate thereafter, a relatively long time period is required for this ID checking. Accordingly, it takes a considerable time period from when the vehicle driver performs the operation of pushing in the ignition knob to when actual rotational operation is performed.

It would be desirable to provide an electronic key apparatus for an automobile which shortens the time period required from when operation of the ignition knob is performed until the time point when rotation of the ignition knob is actually permitted, and an arrest cancellation method for a rotation arresting device.

An electronic key apparatus for a vehicle according to the present invention comprises a rotational operation device which starts the vehicle by a rotational operation, a rotation arresting device which constrains the rotational operation so as to stop the rotational operation, a preliminary operation detection device which detects preliminary operation performed prior to rotational operation of the rotational operation device, an ID checking device which performs an ID check with a portable unit which at least is used to lock and unlock a door of the vehicle, and also an ID check with the rotation arresting device and a release command transmission device which transmits a command to the rotation arresting device to release the prohibition of rotational operation of the rotation operation device, based upon the ID checking result with the portable unit and the ID checking result with the rotation arresting device, performed by the ID checking device. In the electronic key apparatus the ID checking device performs an ID check with the rotation arresting device before the preliminary operation of the rotational operation device is detected by the preliminary operation detection device.

An arrest cancellation method for releasing the prohibition of rotation of a rotation operation device according to the present invention comprises performing an ID check with a portable unit which at least is used to lock and unlock a door of the vehicle, performing an ID check with the rotation arresting device which prohibits rotation of the rotation operation device which starts the vehicle by a rotational operation before detecting a preliminary operation performed prior to rotational operation of the rotational operation device and releasing the prohibition of rotation of the rotational operation device based upon these checking results.

DETAILED DESCRIPTION OF THE PREFERRED EMBODIMENT

Figure 1:
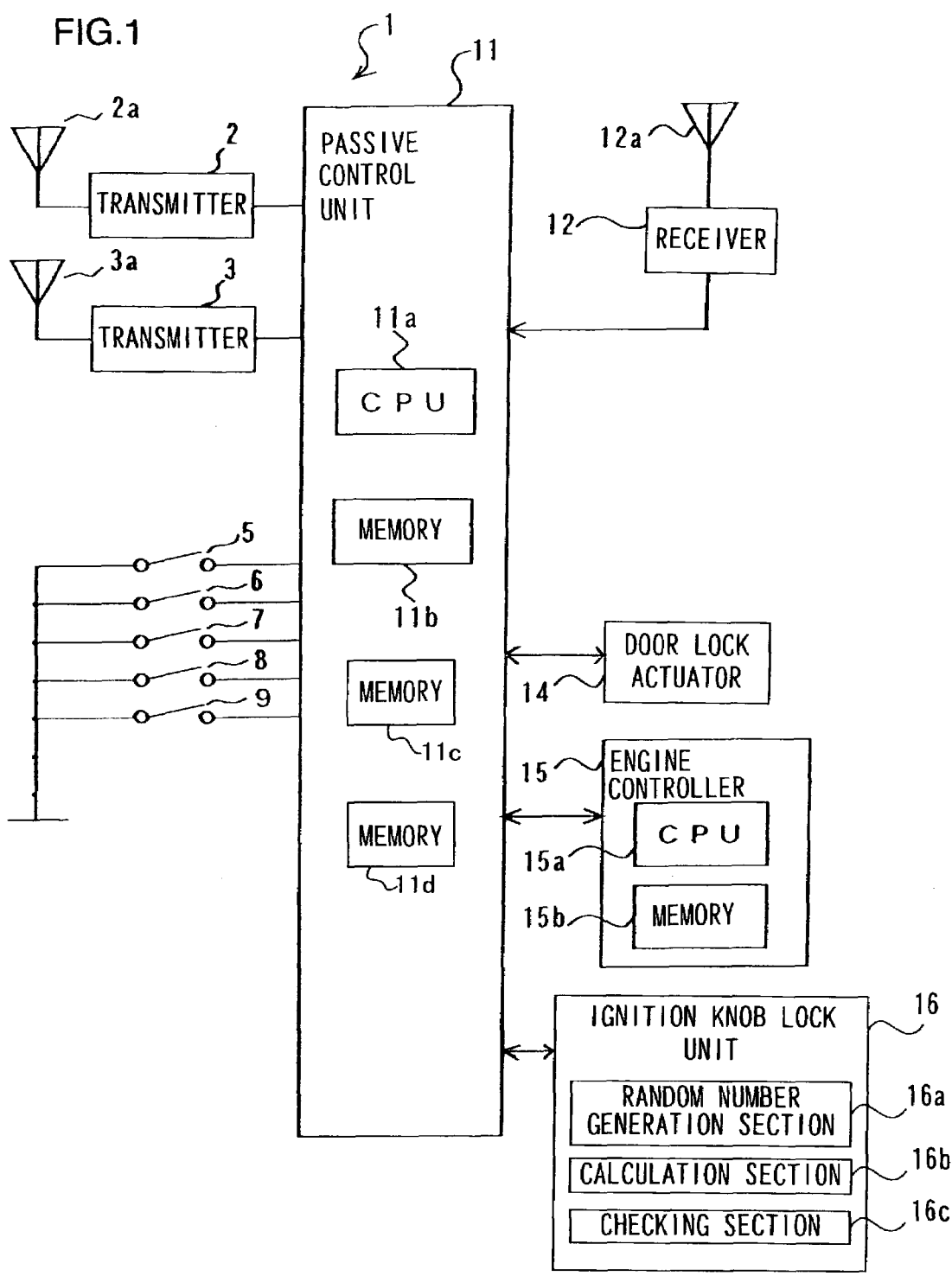
FIG. 1 is a schematic figure showing the structure of a vehicle mounted device incorporated in the preferred embodiment of the electronic key apparatus of the present invention.
Figure 2:
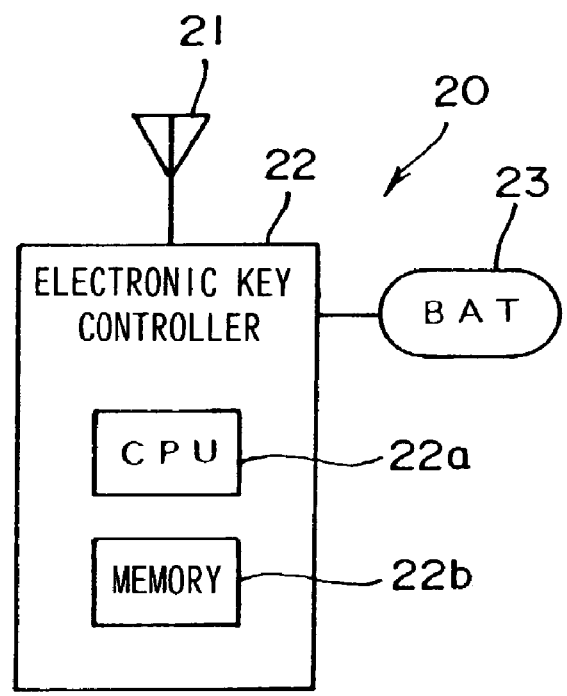
FIG. 2 is a schematic figure showing the structure of an electronic key incorporated in this preferred embodiment.
Figure 3:
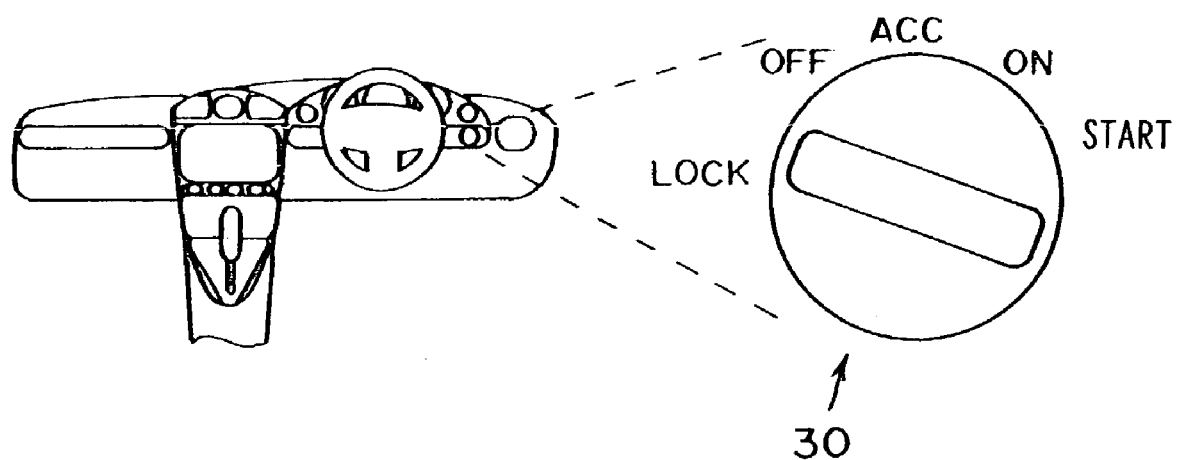
FIG. 3 is a figure showing an ignition knob of this preferred embodiment.

FIG. 1 schematically shows the structure of a vehicle mounted device which is incorporated in the preferred embodiment of the electronic key apparatus for a vehicle according to the present invention. FIG. 2 schematically shows the structure of an electronic key to be carried by the vehicle driver, which is incorporated in the preferred embodiment of the electronic key apparatus for a vehicle according to the present invention. FIG. 3 shows an ignition knob of the vehicle, which is used when performing engine starting or the like.

As shown in FIG. 2, the electronic key 20 comprises an antenna 21, an electronic key controller 22, and a battery 23. The electronic key controller 22 comprises a CPU 22a and peripheral components such as a nonvolatile memory 22b and the like, and engages in wireless transmission with the vehicle mounted device 1 via the antenna 21. An ID for determining permission to drive the vehicle is stored in the nonvolatile memory 22b. The battery 23 is of the replaceable type, and supplies electrical power to the electronic key controller 22.

This electronic key 20 comprises a door lock button and a door unlock button which are not shown in the drawings, and, when these buttons are operated, the ID is read out from the nonvolatile memory 22b, and this ID which has been read out is transmitted to the vehicle mounted device 1 together with a lock request signal or an unlock request signal. Furthermore, when the electronic key 20 receives an ID request signal transmitted from the vehicle mounted device 1 which requests the ID of the holder, it reads out the ID from the nonvolatile memory 22b, and transmits this ID which has been read out to the vehicle mounted device 1.

The electronic key 20 is not formed as a key plate like a prior art type ignition key, but is made so as to be easy for the vehicle driver to carry on his person; for example, it may be shaped like a card. Furthermore, since when the electronic key 20 is being used it is not physically received in any key cylinder unit provided in the vehicle mounted device 1, accordingly the vehicle driver needs only to carry the electronic key 20 on his person even when he has boarded the vehicle. Due to this, in this preferred embodiment of the present invention, an ignition knob lock unit 16 which locks (arrests) the rotation of the ignition knob 30, as shown in FIG. 3, is provided, instead of the key cylinder unit of a prior art type electronic key system for a vehicle. This ignition knob lock unit 16 is disposed in the instrument panel on the side of the driver's seat. Accordingly, when starting the vehicle engine, the procedure of inserting an ignition key and turning it is not necessary.

The ignition knob lock unit 16 comprises a knob rotation prevention latch (not shown in the drawings) for locking the ignition knob 30 and preventing its rotational operation. When this knob rotation prevention latch is driven in its release direction, rotational operation of the ignition knob 30 and of the steering wheel becomes possible. Furthermore, the ignition knob lock unit 16 comprises a random number generation section 16a, a calculation section 16b, and a checking section 16c. The random number generation section 16a generates a random number (challenge data) based upon a request from a passive control unit 11. The calculation section 16b performs a predetermined calculation based upon this random number which has been generated by the random number generation section 16a. The checking section 16c checks the result of this calculation which has been calculated by the calculation section 16b against the calculation result which has been transmitted from the passive control unit 11, and returns the result of this checking (ACK) to the passive control unit 11.

When the driver of the vehicle intends to start its engine, it is necessary for him first to press the ignition knob 30 inwards and then to perform rotational operation thereof. When the ignition knob 30 is in the locked position (LOCK) shown in FIG. 3, then the steering wheel of the vehicle is locked. When the ignition knob 30 is pushed inwards while it is in this locked position, a push switch 5 is turned ON. In other words, the push switch 5 can also be termed a switch which detects the preparatory pushing inward operation of the ignition knob 30 for subsequently performing rotational operation thereof. When the ignition knob 30 is rotated to the ignition on position (ON) for operating the engine, an ignition on switch 6 is turned ON. Furthermore, when the ignition knob 30 is rotated to the engine start position (START) for starting the engine, an engine start switch 7 is turned ON, and the engine is started by a starter motor not shown in the drawings.

Figure 4:
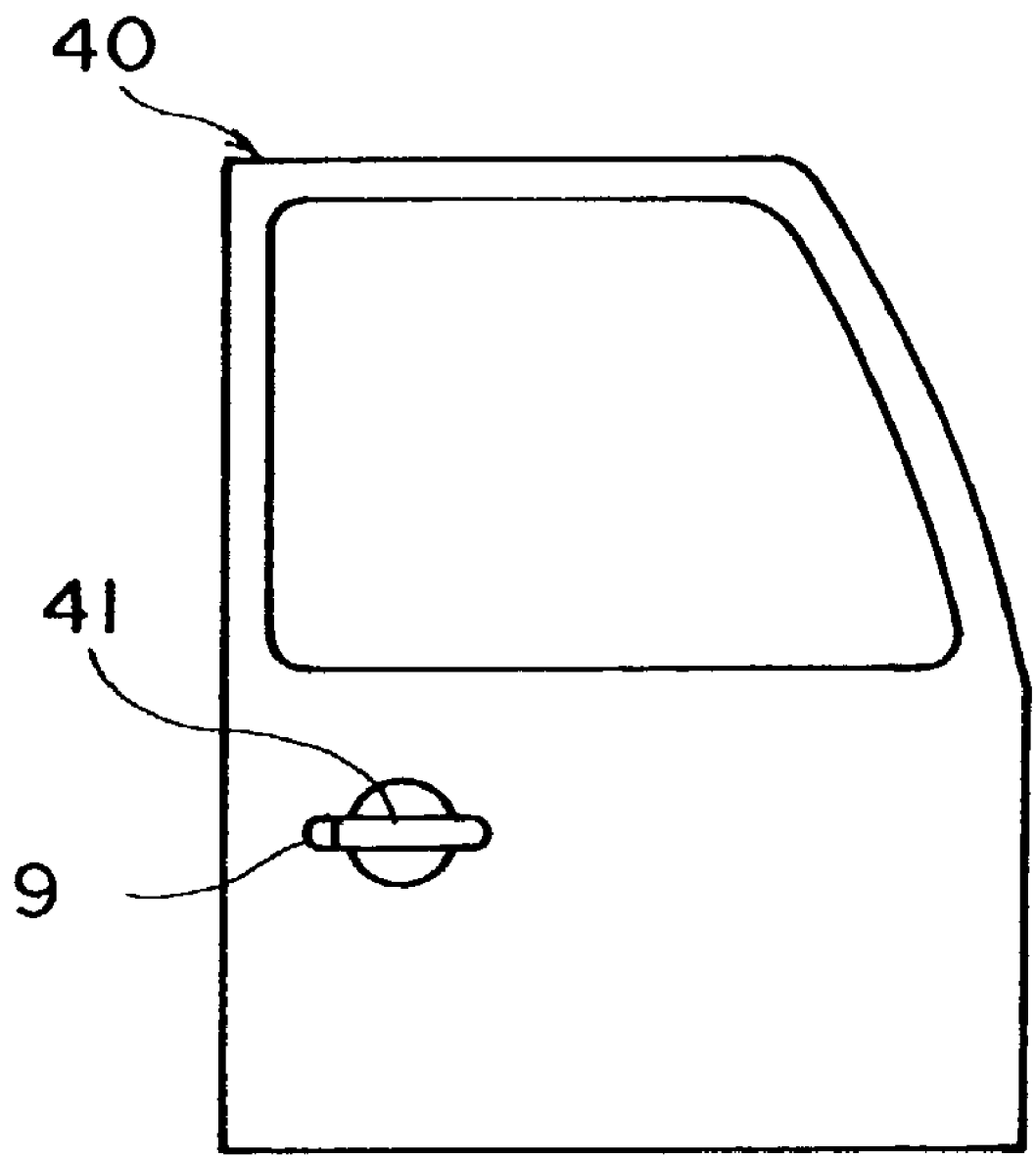
FIG. 4 is a figure showing a driver's side door.

A switch 8 detects the opened or closed state of the vehicle doors, and it is ON when any door is open, while it is OFF when all the doors are closed. A switch 9 is a door lock switch for starting the door lock operation of the driver's door. As shown in FIG. 4, this door lock switch 9 is provided in the vicinity of the outside door handle 41 of the driver's door 40. When the driver operates (presses) the door lock switch 9 from outside the vehicle for locking or unlocking the doors of the vehicle, this door lock switch 9 goes from OFF to ON.

The vehicle mounted device 1 comprises transmitters 2 and 3 and a receiver 12, for performing wireless communication with the electronic key 20. The transmitter 2 transmits an ID request signal which will be described here in after via an antenna 2a provided within the vehicle to the interior of the vehicle body. The transmitter 3 is provided in the vicinity of the outside door handle 41 of the driver's door 40, and transmits an ID request signal to a predetermined area on the outside of the vehicle body (for example, to the vicinity of the driver's door) via an antenna 3a.

The receiver 12 is provided upon the rear parcel shelf at the rear portion of the vehicle, and receives via an antenna 12a a lock request signal, an unlock request signal, ID, and the like which are transmitted from the electronic key 20. These signals which are received are transmitted to the passive control unit 11. When a lock or unlock request signal or an ID has been transmitted from the electronic key 20, the passive control unit 11 performs checking of the ID of the electronic key 20, and, if it determines that the ID matches, outputs a lock or unlock command as appropriate to the door lock actuator 14. This door lock actuator 14 performs locking or unlocking of the driver's door, the passenger door, and the rear seat doors, based upon this command.

Furthermore, when an ID is received which has been transmitted from the electronic key 20 based upon the ID request signal which has been transmitted via the antenna 3a, the passive control unit 11 performs checking of this ID of the electronic key 20 which has been transmitted, and, if it judges that the ID matches, performs unlocking or locking of the driver's door, the passenger door, and the rear seat doors, based upon the current lock state of these doors (i.e., upon whether these doors currently are locked or are unlocked).

An engine controller 15 comprises a CPU 15a and a nonvolatile memory 15b and so on, and controls a throttle valve control device, a fuel injection device, and an ignition control device, none of which are shown in the drawings, so as to control the rotational speed and the output torque of an engine, also not shown in the drawings.

The passive control unit 11 comprises a CPU 11a, a nonvolatile memory 11b, a memory 11c, and another memory 11d. The nonvolatile memory 11b stores a previously registered ID for the electronic key 20 and the same calculation equation as the calculation equation which is stored in the calculation section 16b in the ignition knob lock unit 16. The memory 11c stores an ID-OK flag which will be described hereinafter. The memory 11d stores a preliminary ID checking result with an ignition knob lock unit 16 which will also be described hereinafter.

The CPU 11a transmits via the transmitter 3 and the antenna 3a an ID request signal corresponding to the operational state of the door lock switch 9, and receives via the receiver 12 a lock request or an unlock request signal and an ID which have been transmitted from the electronic key 20. When the ID of the electronic key 20 is received, the CPU 11a checks the ID which has been received against the ID which is stored in the memory 11b. Moreover, based upon the result of this ID checking, upon the lock request or unlock request signal, and upon the current lock state of the doors (i.e., whether the doors are locked or unlocked), the CPU 11a controls the door lock actuator 14 to perform door locking or unlocking, and also sets or resets the ID-OK flag in the memory 11c. Here, this ID-OK flag is a flag in the memory 11c which is set as an engine starting permit flag, if, when checking the ID which has been transmitted from the electronic key 20 against the ID which is stored in the memory 11*b*, these IDs match, and moreover the doors become unlocked; and which is reset if the IDs do not match, or if the doors become locked.

Furthermore, when the door switch 8 goes from ON to OFF (in other words, the door has gone from the opened state to the closed state), the CPU 11*a* transmits an ID request signal to the inside of the vehicle via the transmitter 2 and the antenna 2*a*, and receives via the receiver 12 the ID which is transmitted from the electronic key 20. The CPU 11*a* checks this received ID against the ID which is stored in the memory 11*b*, and sets or resets the ID-OK flag in the memory 11*c* based upon the result of this checking procedure.

Yet further, when the previously described ID-OK flag is set, the CPU 11*a* requests the ignition knob lock unit 16 to transmit a random number (challenge data), which has been stored in the memory 11*d* based upon the result of a preliminary checking which will be described hereinafter. And, based upon the random number which has been transmitted from the ignition knob lock unit 16, the CPU 11*a* performs a calculation with the calculation equation which has been stored in the memory 11*b*, and transmits the result of this calculation and an unlock command to the ignition knob lock unit 16. Furthermore, the CPU 11*a* controls the engine controller 15 based upon the operational states of the ignition knob switches 5 through 7, and performs starting or stopping of the engine.

Figure 5:
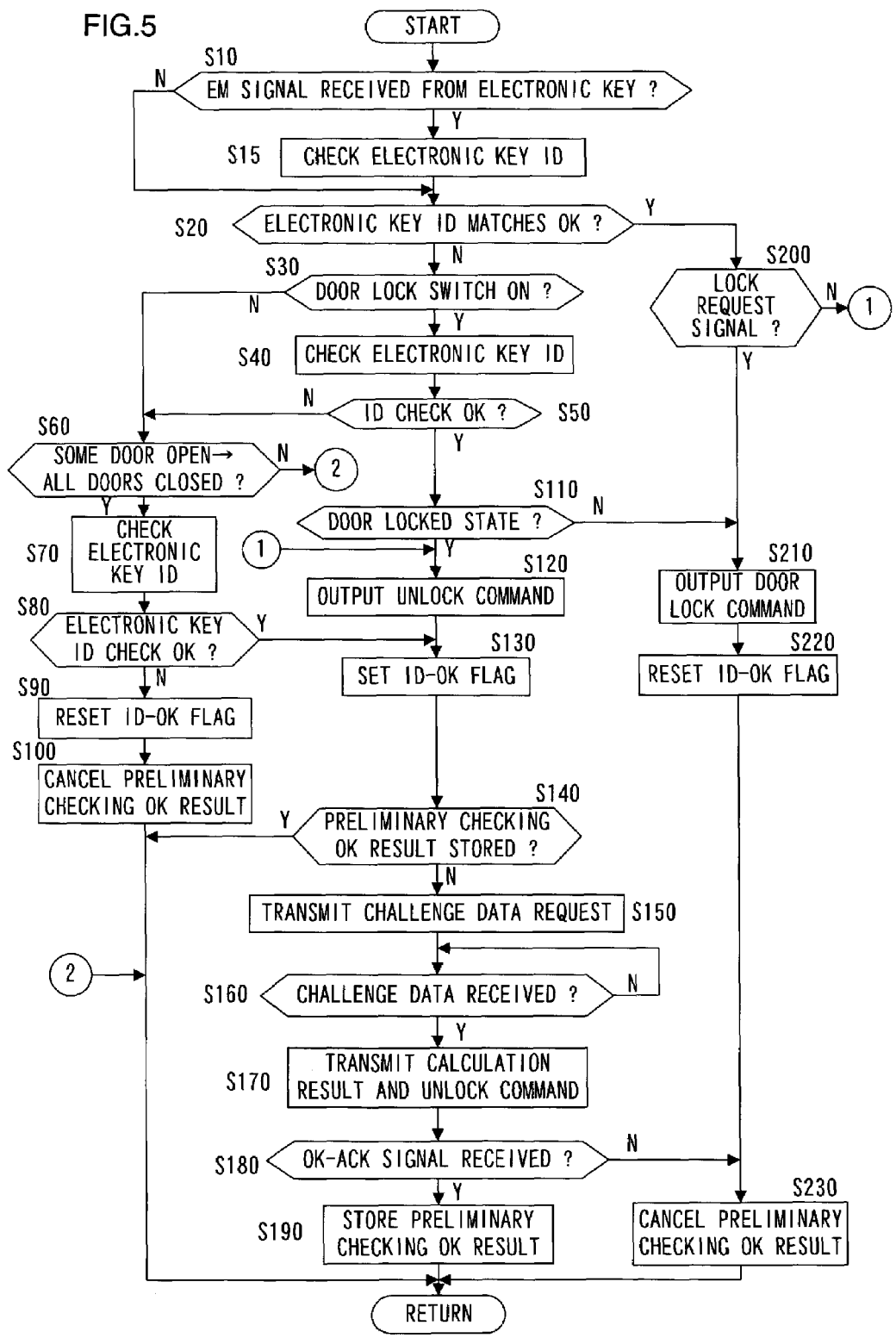
FIG. 5 is a flow chart for this preferred embodiment, showing the control flow of a preliminary checking procedure.
Figure 6:
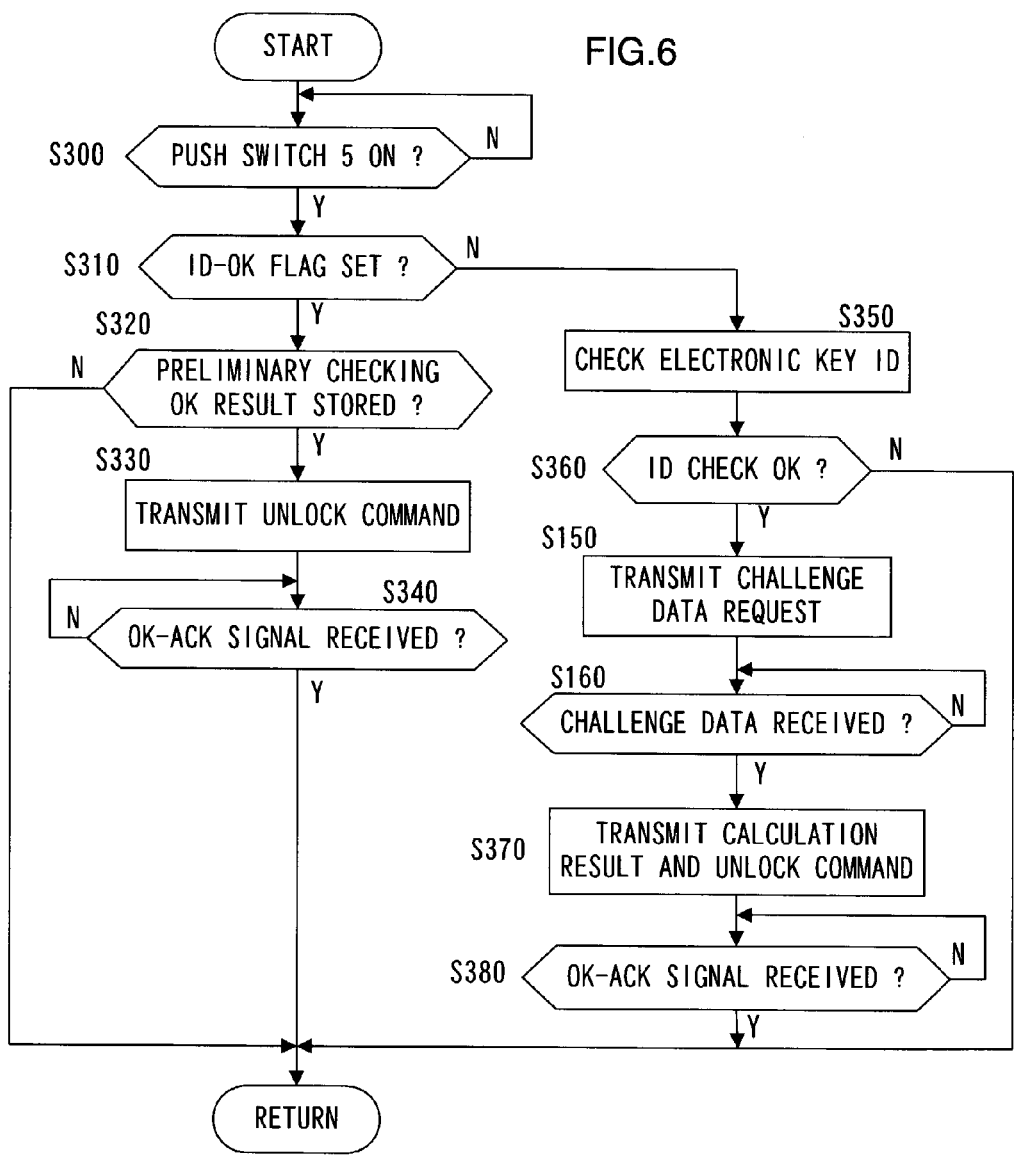
FIG. 6 is a flow chart for this preferred embodiment, showing the control flow from when the operation of pushing in the ignition knob is performed to the time point at which rotation operation is permitted.

With the electronic key apparatus for a vehicle according to this preferred embodiment of the present invention, ID checking is performed between the ignition knob lock unit 16 and the passive control unit 11, before the driver performs the operation of pushing in the ignition knob 30 for starting the engine of the vehicle. FIG. 5 is a flow chart showing, in this preferred embodiment, the flow of a control procedure for this ID checking which is performed on a preliminary basis between the ignition knob lock unit 16 and the passive control unit 11. FIG. 6 is a flow chart showing, in this preferred embodiment, the flow of a control procedure from the time point when the operation of pushing in the ignition knob 30 is performed to the time point when rotation of the ignition knob 30 is permitted. These control procedures are performed by the passive control unit 11 in the vehicle mounted device 1.

In a step S10 of the flow chart shown in FIG. 5, it is judged as to whether or not a radio signal transmitted from the electronic key 20 has been received. This radio signal is generated if the driver of the vehicle who is carrying the electronic key 20 operates the door lock button or the door unlock button (not shown in the drawings) of the electronic key 20, so as to lock or to unlock the doors of the vehicle. If it is judged that such a radio signal has been received, then the flow of control proceeds to a step S15, while, if it is judged that such a radio signal has not been received, then the flow of control proceeds to a step S30. In the step S15, ID checking of the electronic key 20 is performed based upon the ID signal which is included in this radio signal which has been received. Then in a next step S20, based upon the result of ID checking which was performed in the step S15, it is judged as to whether or not the ID which has been received and the ID which has been previously recorded in the memory 11*b* match one another. If it is judged that they do match, then the flow of control is transferred to a step S200, while if they do not match, then the flow of control is transferred to the step S30.

In the step S30, based upon the signal from the door lock switch 9, it is judged as to whether or not the door lock switch 9 has gone from its OFF state to its ON state. If it is judged that indeed the door lock switch 9 has gone from its OFF state to its ON state, then the flow of control is transferred to a step S40, while if it is judged that the door lock switch 9 has not gone from its OFF state to its ON state, then the flow of control is transferred to a step S60.

In the step S40, checking of the ID of the electronic key 20 is performed. In this ID checking, first, an ID request signal is transmitted from the transmitter 3 via the door antenna 3*a* to the electronic key 20. When it has received this ID request signal, the electronic key 20 transmits its ID to the vehicle mounted device 1. This ID of the electronic key 20 which has been transmitted is received by the receiver 12 via the antenna 12*a*, and is transmitted to the passive control unit 11. The passive control unit 11 performs ID checking based upon the ID which has been transmitted and the recorded ID stored in the memory 11*b*. When the ID checking has been completed, the flow of control proceeds to a step S50.

In the step S50, it is judged as to whether or not the ID of the electronic key 20 matches, based upon the result of the ID check which was performed in the step S40. If the IDs do match one another then the flow of control is transferred to the step S110, while if they do not match then the flow of control is transferred to the step S60. In this step S60, it is judged as to whether or not the state in which some one of the vehicle doors was open has changed to the state in which the doors are all closed. This judgement is performed based upon the signal which is transmitted from the switch 8 which detects the opened or closed state of the doors. If this judgement is YES then the flow of control is transferred to a step S70, while if it is NO then this control program terminates.

In the step S70, checking of the ID of the electronic key 20 is performed. In this ID checking, first, an ID request signal is transmitted from the transmitter 2 via the door antenna 2*a* within the vehicle to the electronic key 20. When it has received this ID request signal, the electronic key 20 transmits its ID to the vehicle mounted device 1. This ID of the electronic key 20 which has been transmitted is received by the receiver 12 via the antenna 12*a*, and is transmitted to the passive control unit 11. The passive control unit 11 performs ID checking based upon the ID which has been transmitted and the recorded ID stored in the memory 11*b*. When the ID checking has been completed, the flow of control proceeds to a step S80.

In the step S80, it is judged as to whether or not the ID of the electronic key 20 matches, based upon the result of the ID check which was performed in the step S70. If the IDs do indeed match one another, then the flow of control is transferred to the step S130, while if they do not match then the flow of control is transferred to the step S90. In this step S90 an ID-OK flag which will be described hereinafter is reset, and then the flow of control is transferred to a step S100. In this step S100, as will be described hereinafter, a preliminary checking result which was performed together with the ignition knob lock unit 16 is cancelled (is reset), and then this control program terminates.

When the judgement in the step S50 is that the ID of the electronic key 20 does not match, so that the flow of control is transferred to the step S110, then it is judged as to whether or not the driver's door 40 of the vehicle is in the locked state. If it is judged that the driver's door is indeed in the locked state, then the flow of control is transferred to a step S120, while if it is judged that the driver's door is in the unlocked state, then the flow of control is transferred to the step S210. In the step S120, an unlock command is outputted to the door lock actuator 14, and then the flow of control is transferred to the step S130. The door actuator which has received this unlock command performs unlocking of the driver's door, the passenger door, and the rear doors.

In the step S130, the ID-OK flag is set. This ID-OK flag is a flag for setting the engine starting permitted state. When the ID-OK flag is set, the flow of control is transferred to the step S140. In this step S140, it is judged as to whether or not an OK result for the preliminary checking which was performed together with the ignition knob lock unit 16 is stored in the memory 11d. If it is judged that indeed an OK result of this preliminary checking is stored, then this control program terminates, whereas if it is judged that no such OK result is stored, then the flow of control is transferred to a step S150.

In the step S150, a challenge data request signal is transmitted to the ignition knob lock unit 16 for performing preliminary ID checking together with the ignition knob lock unit 16. This challenge data is a random number for performing ID checking. When the challenge data request signal has been transmitted, the flow of control is transferred to a step S160. In this step S160, it is judged as to whether or not challenge data has been transmitted from the ignition knob lock unit 16. If it is judged that such challenge data has been received, then the flow of control is transferred to a step S170, while if it is judged that such challenge data has not been received, then the flow of control loops back to this step S160, to continue waiting for the challenge data.

In the step S170, along with performing the predetermined calculation for the ID check based upon the challenge data, in other words upon the random number, which has been received in the step S160, also the result of the calculation and an unlock command are transmitted to the ignition knob lock unit 16. When the calculation result and the unlock command have been transmitted, the flow of control is transferred to a step S180. When it has received the calculation result which was transmitted in the step S170, the ignition knob lock unit 16 performs preliminary ID checking by judging as to whether or not the result of the calculation which it itself has performed based upon the random number, and the result of the calculation which has been transmitted from the passive control unit 11, match with one another. If indeed these calculation results match with one another, then it is judged that the ID check is OK, and, along with releasing the locking of the knob rotation prevention latch, the ignition knob lock unit 16 also transmits an OK-ACKNOWLEDGE signal (hereinafter termed the OK-ACK signal) to the passive control unit 11. On the other hand, if these calculation results do not agree with one another, then the ignition knob lock unit 16 transmits a NG-ACKNOWLEDGE signal (hereinafter termed the NG-ACK signal) to the passive control unit 11.

In the step S180, it is judged as to whether or not an OK-ACK signal transmitted from the ignition knob lock unit 16 has been received. If it is judged that such an OK-ACK signal has been received, then the flow of control is transferred to a step S190, while if it is judged that a NG-ACK signal has been received, then the flow of control is transferred to a step S230. In the step S190, since the preliminary checking of ID has been authenticated between the passive control unit 11 and the ignition knob lock unit 16, the OK result of this preliminary checking is stored in the memory 11d, and this control program terminates.

If in the step S20 it is judged that the ID of the electronic key 20 matches, then the flow of control is transferred to the step S200, and it is judged as to whether or not a door lock request signal was included in the radio signal which was received in the step S10. If it is judged that a door lock request signal is indeed included, then the flow of control is transferred to a step S210, while if it is judged that an unlock request signal is included in the radio signal, then the flow of control is transferred to the step S120.

In the step S210, a lock command is outputted to the door lock actuator 14. When it has received this lock command, the door lock actuator 14 performs locking of the driver's door, the passenger door, and the rear doors of the vehicle. After the lock command has been outputted, the flow of control is transferred to a step S220. In this step S220 the ID-OK flag is reset, since the driver may have exited from the vehicle, and the flow of control is transferred to a step S230. In this step S230, the OK result of preliminary checking which is stored in the memory 11d is cancelled, and this control program terminates. Thereafter, the procedures of the above described steps S10 and the following steps are performed repeatedly.

According to the control procedure whose flow chart is shown in FIG. 5, before the driver performs the pushing in operation for the ignition knob, ID checking is performed in advance between the electronic key 20 and the passive control unit 11, and also ID checking is performed between the ignition knob lock unit 16 and the passive control unit 11. As for the timing at which the ID checking of the electronic key 20 is performed, it is when an unlock command for the doors is transmitted by the driver operating the electronic key 20 from outside the vehicle (in the step S15), when the doors are unlocked by the operation of the door lock switch 9 (in the step S40), and when the system goes from the state in which any of the doors are opened to the state in which all of the doors are closed (in the step S70). When it is judged that the check results of this ID checks are OK, then preliminary ID checking with the ignition knob lock unit 16 is performed (in the steps S150 to the steps S190) if an OK result of preliminary checking with the ignition knob lock unit 16 is not currently stored in the memory 11d.

When the driver exits from the vehicle and closes the door behind him (in the step S60), since the electronic key 20 is not left behind within the vehicle, accordingly the result of the ID check (in the step S70) which is performed via the antenna 2a internal to the vehicle is a NG result, and the ID-OK flag and the OK result of preliminary checking are reset (in the step S90 and the step S100). Furthermore, as well, when locking of the door from outside of the vehicle is performed (in the step S210), the ID-OK flag and the OK result of preliminary checking are reset (in the steps S220 and S230). Since, as will be explained hereinafter, the engine can only be started when the ID-OK flag is set and also the result of preliminary checking with the ignition knob lock unit 16 is OK, accordingly a person who is not holding the electronic key 20 is not able to operate the ignition knob 30 or to start the engine of the vehicle.

The flow chart given in FIG. 6 shows the control procedure from the time point when the operation of pushing in the ignition knob 30 is performed to the time point at which the rotation of the ignition knob 30 is permitted. In a first step S300, it is judged as to whether or not the push switch 5 has gone to ON, in other words, as to whether or not the operation of pushing in the ignition knob 30 has been performed. If it is judged that indeed the push switch 5 has gone from OFF to ON, then the flow of control is transferred to a step S310, while if the push switch 5 has not gone to ON, then the flow of control loops back to this step S300 again, to wait until the push switch 5 does in fact go to ON.

In the step S310, it is judged as to whether or not the ID-OK flag is set. The ID-OK flag is a flag which is set when the result of preliminary ID checking with the ignition knob lock unit 16 is OK, in other words, in the step S130 of the flow chart shown in FIG. 5. If it is judged that the ID-OK flag is set, then the flow of control is transferred to the step S320, while if it is judged that the ID-OK flag is not set, then the flow of control is transferred to a step S350.

In the step S320, it is judged as to whether or not an OK result of preliminary ID checking is stored in the memory 11d. If, as the result of preliminary ID checking which was performed in the flow chart shown in FIG. 5 with the ignition knob lock unit 16, an OK result of preliminary checking was stored in the memory 11d in the step S190, then the flow of control is transferred to a step S330. In this step S330, an unlock command for permitting the rotation of the ignition knob which is currently locked is transmitted to the ignition knob lock unit 16. When this unlock command has been transmitted, the flow of control proceeds to a step S340.

When it receives this unlock command, the ignition knob lock unit 16, along with permitting the rotation of the ignition knob 30, transmits an OK-ACK signal to the passive control unit 11. In the step S340, it is judged as to whether or not an OK-ACK signal which has been transmitted from the ignition knob lock unit 16 has been received. If it is judged that an OK-ACK signal has been received, then this control program terminates, while if it is judged that no such OK-ACK signal has been received, then the flow of control loops back to this step S340, to wait until an OK-ACK signal is indeed received.

If in the step S310 it is judged that the ID-OK flag is not set, then the flow of control is transferred to a step S350, and checking of the ID of the electronic key 20 is performed. When the ID checking of the electronic key 20 has been performed, the flow of control proceeds to a step S360. In this step S360, based upon the result of the ID check which was performed in the previous step S350, it is judged as to whether or not the result of the ID check is OK. If it is judged that indeed the result of this ID check is OK, in other words, if it is judged that the ID which has been transmitted from the electronic key 20 and has arrived, and the ID which was stored in advance in the memory 11b, match with one another, then the flow of control is transferred to the step S150, while if these IDs do not match with one another then the flow of this control program terminates.

Since the procedures which are performed in this step S150 and in an immediately subsequent step S160 are the same as those which were performed in the step S150 and the step S160 of the flow chart shown in FIG. 5, their explanation will be omitted. If in the step S160 it is judged that the challenge data has been received, then the flow of control is transferred to a step S370. In this step S370, based upon the challenge data which was received in the step S160, in other words the random number, the predetermined calculation for ID checking is performed, and the calculation result and an unlock command for permitting the rotation of the ignition knob 30 are transmitted to the ignition knob lock unit 16. When this calculation result and the unlock command have been transmitted, the flow of control proceeds to a step S380.

When it has received this calculation result and the unlock command, the ignition knob lock unit 16 performs an ID check by judging as to whether or not the result of calculation which it performs itself based upon the random number, and the calculation result which has been transmitted from the passive control unit 11 and has arrived, match with one another. If it is judged that the ID check is OK, then along with permitting the rotation of the ignition knob 30, an OK-ACK signal is transmitted to the passive control unit 11.

In the step S380, it is judged as to whether or not such an OK-ACK signal has been received from the ignition knob lock unit 16. If it is judged that indeed such an OK-ACK signal has been received, then the flow of this control program terminates, while on the other hand, if it is judged that no such OK-ACK signal has been received, then the flow of control loops back to this step S380, to wait until the OK-ACK signal is received. Thereafter, the procedures of the above described steps S300 and the following steps are performed repeatedly.

According to the control procedure whose flow chart is shown in FIG. 6, when (in the step S300) pushing in operation of the ignition knob 30 is performed, the ID-OK flag is set (in the step S310), and moreover, if an OK result of preliminary checking is stored in the memory 11d (in the step S320), then a rotation permit command for the ignition knob 30 is immediately transmitted to the ignition knob lock unit 16 (in the step S330).

In the above, according to this preferred embodiment of the electronic key apparatus for a vehicle according to the present invention, since ID checking is performed in advance between the ignition knob lock unit 16 and the passive control unit 11 before the driver performs pressing in operation of the ignition knob in order to start the engine of the vehicle, accordingly it is possible to shorten the time period which is required before rotation of the ignition knob 30 is permitted. In particular, it is possible further to shorten the time period which is required until rotation of the ignition knob 30 is permitted, since, as explained above using the flow chart shown in FIG. 6, an ID check between the electronic key 20 and the passive control unit 11 is performed in advance, and the ID-OK flag is set if the result of this check is OK, and rotation of the ignition knob 30 is permitted by using this ID-OK flag and the preliminary checking result with the ignition knob lock unit 16. In this case, since it is arranged to reset the ID-OK flag if the ID check result with the electronic key 20 is NG, or if the driver exits from the vehicle, accordingly it is ensured that a person who is not in possession of the electronic key 20 is not able to operate the ignition knob 30 to start the engine of the vehicle.

The above described embodiment is an example, and various modifications can be made without departing from the spirit and scope of the invention. For example, although it was arranged, in the shown preferred embodiment, not to perform the ID checking of the electronic key 20 when performing pushing in operation of the ignition knob 30 if the ID-OK flag is set, it would be possible, as an alternative, in order further to enhance the anti theft characteristics, to perform a second check of the ID of the electronic key 20, instead of performing the procedure of the step S310 above. In this case as well, by comparison with the prior art, it is possible to shorten the time period which is required until the time point at which rotation of the ignition knob is permitted, since the ID checking of the ignition knob lock unit 16 is performed in advance.

Furthermore although, in the above description of the preferred embodiment of the electronic key apparatus for a vehicle according to the present invention, by way of example, the case was explained of the application of the present invention to a vehicle in which the engine was started by the rotational operation of an ignition knob 30, it would also be possible, as an alternative, to apply the present invention to an electrically powered vehicle which was driven using a drive motor, instead of an internal combustion engine.

The disclosure of the following priority application is herein incorporated by reference:

Japanese Patent Application No. 2002-36527, filed Feb. 14, 2002.

What is claimed is:

1. An electronic key apparatus for a vehicle, comprising:
    a vehicle starting operation device which is rotationally operable after a preliminary operation has been performed to start the vehicle;
    a rotation arresting device which constrains a rotational operation of the vehicle starting operation device so as to inhibit the start of the vehicle;
    a preliminary operation detection device which detects the preliminary operation;
    an ID checking device which performs a first ID check and a second ID check; and
    a release command transmission device which transmits a command to the rotation arresting device to release the constraint of the rotational operation of the vehicle starting operation device based upon the ID checking results of the first and second ID checks performed by the ID checking device,
    wherein the ID checking device is configured so that the first ID check is performed between a portable unit and the ID checking device after a driver has gotten into the vehicle, wherein if the first ID check succeeds a success indication for the first ID check is memorized,
    wherein the ID checking device is configured so that the second ID check is performed between the rotation arresting device and the ID checking device when the success indication for the first ID check has been memorized, wherein if the second ID check succeeds a success indication for the second ID check is memorized,
    wherein the release command transmission device is confirmed to transmit the command to the rotation arresting device to release the constraint of rotational operation of the vehicle starting operation device when a confirmation is made that both the success indications of the first and second ID checks have been memorized, wherein the release command transmission device is configured to transmit the command in response to the detection of the preliminary operation by the preliminary operation detection device.

2. An electronic key apparatus for a vehicle according to claim 1, wherein:
    the ID checking device performs an ID check with the rotation arresting device when unlocking operation of a door of the vehicle is performed.

3. An electronic key apparatus for a vehicle according to claim 2, wherein: the preliminary operation detected by the preliminary operation detection device is an operation of pushing in the rotational operation device.

4. An electronic key apparatus for a vehicle according to claim 1, further comprising:
    a door open/closed state detection device which detects the open/closed state of a door of the vehicle, wherein:
    the ID checking device performs an ID check with the rotation arresting device when it is detected by the door open/closed state detection device that all the doors of the vehicle are closed.

5. An electronic key apparatus for a vehicle according to claim 4, wherein:
    the preliminary operation detected by the preliminary operation detection device is an operation of pushing in the rotational operation device.

6. An electronic key apparatus for a vehicle according to claim 1, wherein:
    the preliminary operation detected by the preliminary operation detection device is an operation of pushing in the rotational operation device.

7. An electronic key apparatus for a vehicle according to claim 1, wherein:
    the ID checking device performs the ID check with the rotation arresting device by utilizing a random number.

8. An electronic key apparatus for a vehicle according to claim 1, wherein:
    the portable unit is an electronic key.

9. An electronic key apparatus for a vehicle according to claim 1, wherein the ID checking device performs the second ID check with the rotation arresting device before the preliminary operation of the rotational operation device is detected by the preliminary operation detection device.

10. An electronic key apparatus for a vehicle according to claim 9, wherein the preliminary operation detected by the preliminary operation detection device is an operation of pushing in the rotational operation device.

11. An electronic key apparatus for a vehicle, comprising:
    a vehicle starting operation means for starting the vehicle, wherein the vehicle starting means is rotationally operable after a preliminary operation has been performed to start the vehicle;
    a rotation arresting means for constraining a rotational operation of the vehicle starting operation means so as to inhibit the start of the vehicle;
    a preliminary operation detection means for detecting the preliminary operation;
    an ID check means for performing a first ID check and a second ID check; and
    a release command transmission means for transmitting a command to the rotation arresting means to release the constraint of the rotational operation of the vehicle starting operation means based upon the ID checking results of the first and second ID checks performed by the ID check means,
    wherein the ID check means is configured so that the first ID check is performed between a portable unit and the ID check means after a driver has gotten into the vehicle, wherein if the first ID check succeeds a success indication for the first ID check is memorized,
    wherein the ID check means is configured so that the second ID check is performed between the rotation arresting means and the ID check means when the success indication for the first ID check has been memorized, wherein if the second ID check succeeds a success indication for the second ID check is memorized,
    wherein the release command transmission means is configured to transmit the command to the rotation arresting means to release the constraint of rotational operation of the vehicle starting operation means when a confirmation is made that both the success indications of the first and second ID checks have been memorized, wherein the release command transmission means is configured to transmit the command in response to the detection of the preliminary operation by the preliminary operation detection means.

12. An arrest cancellation method for releasing prohibition of rotation of a vehicle starting operation device, comprising:

performing a first ID check between a portable unit and an ID checking device after a driver has gotten into the vehicle, wherein the portable unit at least is used to lock and unlock a door of the vehicle, wherein a success indication for the first ID check is memorized if the first ID check succeeds;

detecting a preliminary operation to start the vehicle;

performing a second ID check between a rotation arresting device and the ID checking device when the success indication for the first ID check has been memorized, wherein a success indication for the second ID check is memorized if the second ID check succeeds, wherein the rotation arresting device prohibits rotation of the vehicle starting operation device which starts the vehicle; and releasing the prohibition of rotation of the vehicle starting operation device when a confirmation is made that both the success indications of the first and second ID checks have been memorized, wherein the step of releasing the prohibition of rotation of the vehicle starting operation device is performed in response to the detection of the preliminary operation.

* * * * *